M. PELZ.
TIRE ARMOR.
APPLICATION FILED JAN. 30, 1911.

1,009,092.

Patented Nov. 21, 1911.

2 SHEETS—SHEET 1.

WITNESSES
S. Birnbaum
Dr Edmond V Fiza

INVENTOR
Martin Pelz
BY
Sigmund Herzog
his ATTORNEY

M. PELZ.
TIRE ARMOR.
APPLICATION FILED JAN. 30, 1911.

1,009,092.

Patented Nov. 21, 1911.
2 SHEETS—SHEET 2.

WITNESSES
S. Birnbaum
Edmond ...

INVENTOR
Martin Pelz
BY
Sigmund Herzog
his ATTORNEY

COLUMBIA PLANOGRAPH CO., WASHINGTON, D. C.

UNITED STATES PATENT OFFICE.

MARTIN PELZ, OF NEW YORK, N. Y.

TIRE-ARMOR.

1,009,092.　　　　　Specification of Letters Patent.　　Patented Nov. 21, 1911.

Application filed January 30, 1911. Serial No. 605,608.

*To all whom it may concern:*

Be it known that I, MARTIN PELZ, a subject of the German Emperor, and resident of the city of New York, in the county of Kings and State of New York, have invented certain new and useful Improvements in Tire-Armors, of which the following is a specification.

The present invention relates to tire armors for automobile and like pneumatic tires.

One of the objects of the invention is to provide an armor for the outer surface of the tires for protecting the same against rapid and excessive wear, and against puncture.

Another object of the invention is to produce a tire armor, made of a suitable number of sections which can be easily attached to the vehicle wheel and readily replaced as one or the other is worn.

A still further object of the invention is to provide improved means for securing the armor to the vehicle wheel, which will prevent the side slipping and the circumferential slipping of the armor on the tire.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1:
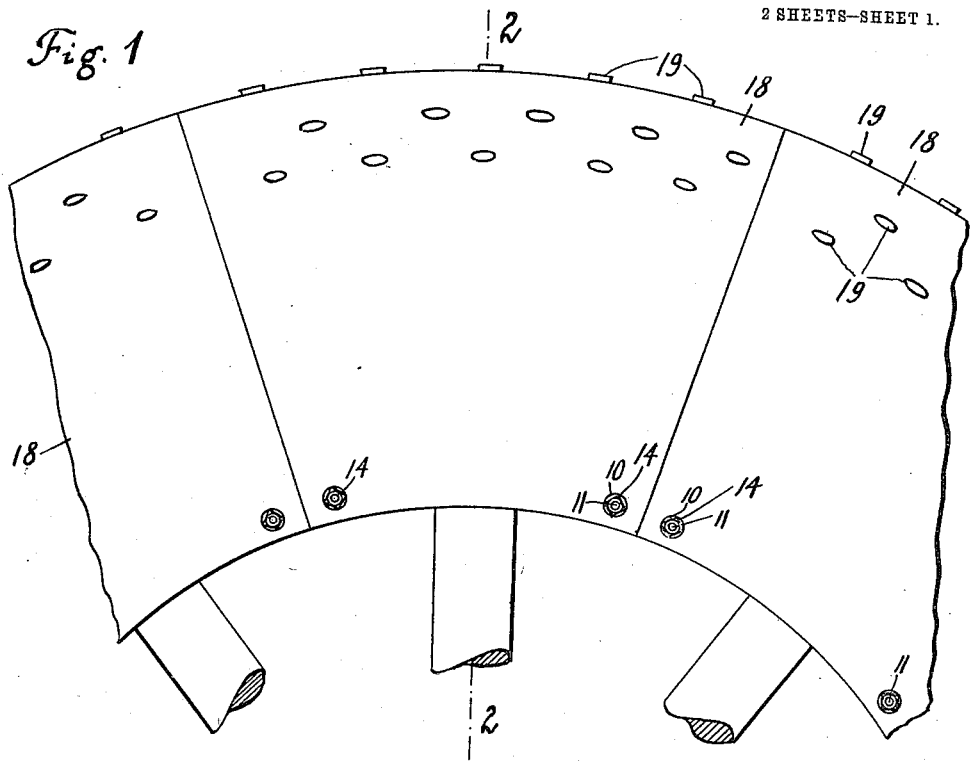
Figure 2:
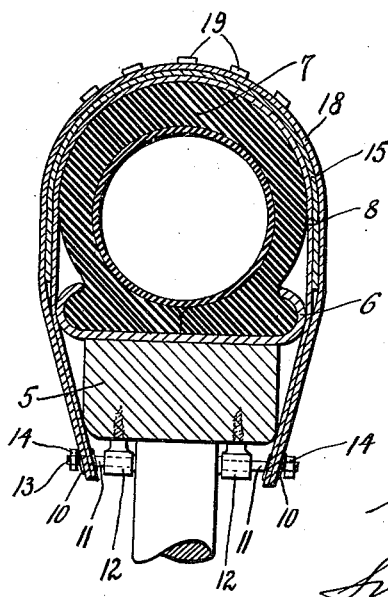
Figure 4:
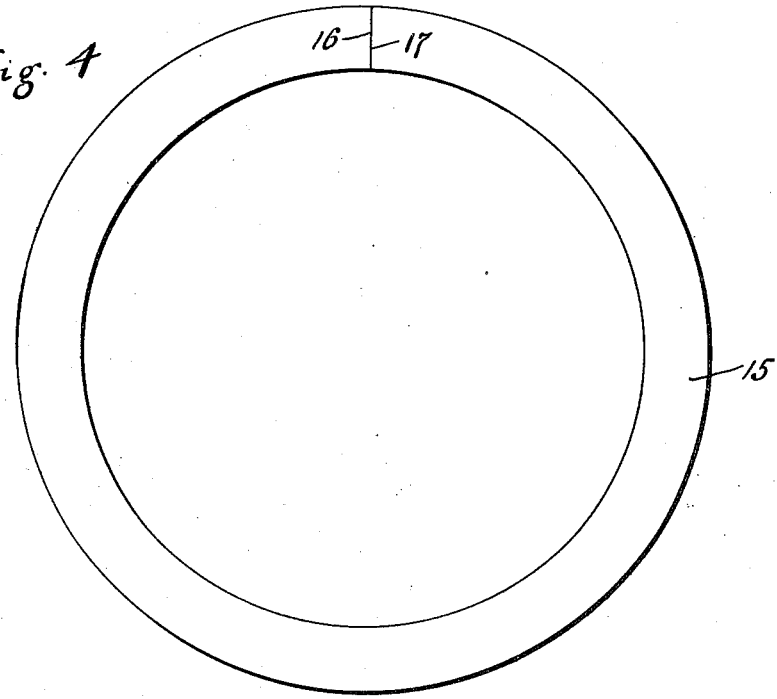
Figure 3:
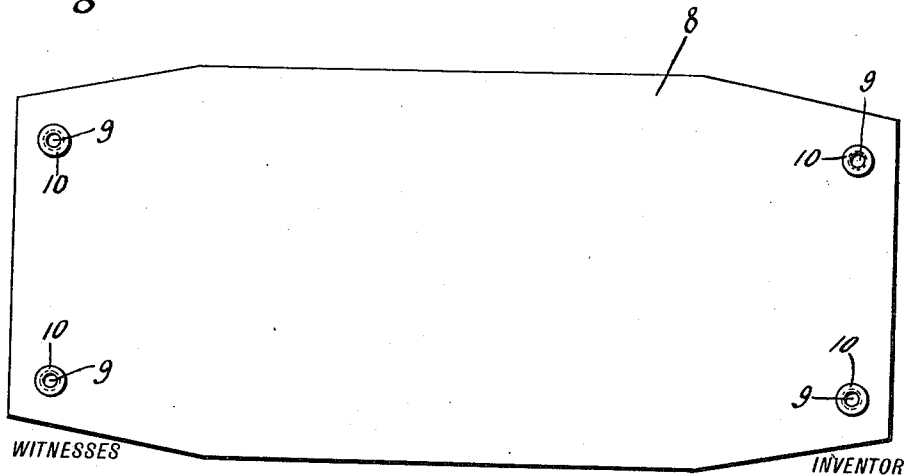

Figure 1 is a side elevation of a portion of a wheel and the invention applied thereto; Fig. 2 is a section taken on line 2—2 of Fig. 1; Fig. 3 is a plan view of one of the armor sections; and Fig. 4 is a side elevation of the metal part of the armor.

In the drawings, the numeral 5 indicates the felly of the wheel, which is provided with a tire carrying rim 6 upon its outer periphery. The pneumatic tire is denoted by the numeral 7, and is carried by the rim 6 in a manner well known in the art.

The armor of the tire consists of three layers, placed on top of one another. The inner layer comprises a plurality of sections 8, 8, each consisting of an eight-sided sheet of leather, or other similar suitable material. These sections abut against each other, extend around and encircle thereby the tire. Each section extends down upon both sides of the wheel to the inner periphery of the felly, and is provided at both of its ends with a plurality of perforations 9, 9, into which eyelets 10, 10 are placed for protecting the perforations. The eyelets are engaged by bolts 11, 11, which are carried by studs 12, 12, suitably attached to the inner periphery of the felly 5. In order to keep the eyelets in engagement with the bolts 11, the free ends of said bolts are threaded, as shown at 13, and in engagement with nuts 14, 14. It is, of course, obvious that any other suitable means, for holding the parts mentioned in engagement with each other, may just as well be made use of. The next layer of the armor consists of a metal shield 15 which is circular in form, U-shaped in cross section, and entirely incloses the tire. The shield 15 is made of one integral piece, its ends 16 and 17 abutting against each other, when the armor is assembled for use. The outer or tread portion of the armor is similar in construction to the inner layer of the armor, with the exception that the outer faces of the sections 18, 18 thereof are provided upon their tread portions with studs 19, 19 for preventing the skidding of the vehicle wheels. The size and number of the sections 18 correspond to those of the sections 8, so that the bolts 11 and nuts 14 serve also to fasten the outer layer of the armor to the wheel.

The improved tire armor may be readily applied to any wheel provided with the usual pneumatic tire. To apply the armor to such a wheel, the tire is first slightly inflated, and the sections 8, 8 of the inner layer of the armor placed upon the wheel, their eyelets 10, 10 being engaged with the corresponding bolts 11, 11. The shield 15 should then be placed on top of the inner layer of the armor, after which the outer sections 18 are arranged upon the shield and in position upon the wheel. In screwing up the nuts 14, the armor will be safely held in position. When now the tire is fully inflated, it will press the three layers of the armor in close contact with each other, preventing thus the lateral and circumferential movement of the shield 15; the movement in these directions of the sections 8 and 18 being prevented by the fastening means described. The purpose of the inner layer of the armor is to prevent injury to the pneumatic tire by the shield 15, while the purpose of the outer layer of the armor is to present a nonskidding treading surface to the ground, and at the same time to hold the shield upon the wheel.

It will be observed that the armor described provides a continuous tread for pneumatic tires, which is formed in a very easy manner of simple sectional members, which do not tend to reduce the resilient nature of the tires, and yet fully protect them against wear and puncture. If any one of the tread sections is injured or worn, it can be removed and replaced with little labor, and without removing the other sections of the armor.

What I claim is:

In a vehicle wheel, the combination with the felly of a wheel, of a tire carrying rim thereon, a pneumatic tire upon said rim, a series of sections of flexible material covering said tire, a U-shaped metal shield circumferentially surrounding said flexible sections, a second series of flexible sections arranged with their edges abutting against each other upon said metal shield and encircling the periphery thereof, and fastening means common to both series of sections for securing the same to said felly and preventing lateral and circumferential movement thereof upon said wheel.

Signed at New York, in the county of New York and State of New York, this 25th day of January, A. D. 1911.

MARTIN PELZ.

Witnesses:
SIGMUND HERZOG,
S. BIRNBAUM.

---

Copies of this patent may be obtained for five cents each, by addressing the "Commissioner of Patents, Washington, D. C."